Nov. 17, 1953
D. D. LEACH
2,659,174
FISHING LINE ACTUATOR
Filed July 25, 1951
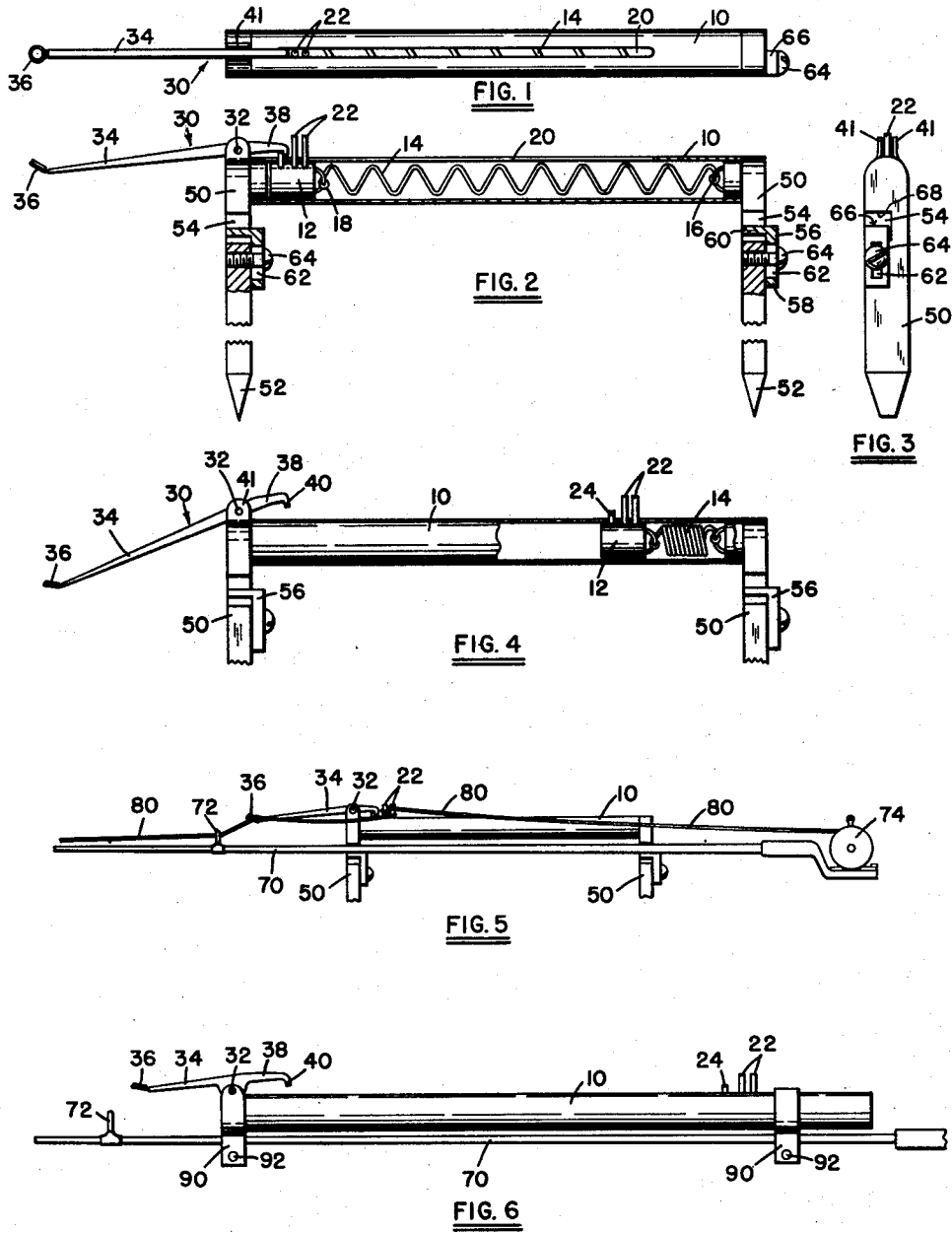
INVENTOR.
DONALD D. LEACH
BY
ATTORNEY

UNITED STATES PATENT OFFICE 2,659,174

FISHING LINE ACTUATOR

Donald D. Leach, Cincinnati, Ohio

Application July 25, 1951, Serial No. 238,511

1 Claim. (Cl. 43—15)

This invention relates to an automatic fishing-line actuator and more particularly to such a device which is constructed and arranged for attachment to a conventional fishing rod.

An object of the invention is to provide an automatic fishing-line actuator which, when associated with a standard fishing rod, will apply a sudden jerk to the fishing line when a fish strikes or takes the hook on the other end of the line.

Another object of the invention is to provide a simple, highly effective fishing-line actuator which may be securely, though releasably clamped to a conventional fishing rod for disposing the line thereof in operative relationship with the line actuating mechanism of the device.

A further object of the invention is to provide a combination fishing rod holder and fishing line actuator which is so constructed and arranged as to facilitate the quick, easy mounting or detachment of a conventional fishing rod and its line, thereby greatly enhancing the utility of the device.

Still a further object of the invention is to provide a combination fishing rod holder and fishing line actuator with support means capable of being inserted into the ground for providing a solid, though temporary mounting means for a fishing rod assembly.

Another object of the invention is to provide a device having the hereinabove described characteristics and which includes means for enabling it to be quickly adapted to accommodate fishing rods of various diameters.

These and other objects are attained by the means described herein and as disclosed in the accompanying drawings in which:

Fig. 1 is a top plan view of a combination fishing rod holder and fishing line actuator embodying the teachings of the present invention.

Fig. 2 is a side view of the device of Fig. 1 with parts thereof being cut away for clarity of detail and understanding, and wherein the fishing-line actuator is in a fully advanced or cocked position.

Fig. 3 is a right end view of the device of Fig. 2.

Fig. 4 is a view somewhat similar to Fig. 2 showing the device in a fully retracted or uncocked position, said device being partly in section.

Fig. 5 is a side view of my device with a conventional fishing rod and its associated fishing line operatively associated therewith.

Fig. 6 is a side view of a modified form of fishing line actuator secured to a conventional fishing rod.

With particular reference to the drawings, the numeral 10 denotes an elongated housing or cylinder and the numeral 12 an element or piston freely slidable therein.

One end of a spring 14 may be secured to the rear end of the housing or cylinder as at 16, the other end being secured to piston 12 as at 18 for thereby normally and yieldably urging the piston to the rear end of housing 10.

An elongated slot 20 is provided in the housing or cylinder 10 through which pins 22 extend. A shorter pin 24 also projects outwardly through slot 20. It will be noted that pins 22 and 24 are fixedly secured to and carried by the piston.

A trigger denoted generally by the numeral 30 is pivotally secured at 32 relative to the forward end of housing or cylinder 10, and includes a forward portion 34 which projects forwardly of and beyond the cylinder terminating in a line eyelet 36 and a rear portion 38 which extends rearwardly over the forward portion of the end cylinder terminating in a downturned leg or latch member 40.

As best illustrated in Figs. 2 and 5, latch member 40 is adapted to releasably engage pin 24 of the piston for securing the piston at the forward end of the housing against the counterforce of spring 14.

In the preferred embodiment of the invention, opposite ends of housing or cylinder 10 are secured to and carried by a pair of laterally spaced support members 50 whose lower ends are provided with tapered portions 52 for facilitating their introduction downwardly into a supporting surface such as, by way of example, the sand or soil of the shoreline adjacent a body of water being fished. A pair of rod receptive notches 54 are provided one in each of supports 50, and in order to facilitate the mounting of various sized rods to my device, suitable means are provided for enabling the fisherman to adjust the effective width of the notch opening to any desired rod diameter. Such means may comprise an L-shaped clamp 56, including legs 58 and 60. Leg 58 may, as best illustrated in Figs. 2 and 3, be provided with an elongated slot 62 for the reception of a set screw or other suitable fastening element 64, the shank of which may threadedly engage portions of support 50. The upper or top edge 66 of leg 60 may be adjusted with respect to lower edge 68 of notch 54 whereby to securely though releasably receive a fishing rod inserted sideways therein.

With particular reference now to Fig. 5, it will be noted that rod 70 has been mounted to and between supports 50 for disposing housing or cylinder 10 above the rod and with trigger eyelet 36 above, adjacent and rearwardly of line eyelet 72 secured to and carried by rod 70. It will, of course, be understood that a plurality of line eyelets such as 72 are disposed in laterally spaced relationship along rod 70, as is conventional. It will likewise be noted that a reel assembly denoted generally by the numeral 74 is located at one end of the rod, as is the custom.

In the preferred embodiment of the invention, line eyelet 36 of the trigger is fabricated as an open loop whereby to facilitate the threading of a fishing line 80 therethrough without necessitating removal of the line from the rod. That is, the fishing line may be threaded through trigger eyelet 36 while the fishing line is mounted to rod 70 by reason of its passing through rod eyelets 72 and terminating in the reel assembly 74, thereby greatly enhancing the utility of the device.

After a fisherman has made a cast, the rod may be mounted to supports 50 as in Fig. 5, after which line 80 may be associated with trigger eyelet 36 and the plunger or piston 12 pulled forwardly to the fully advanced, cocked position illustrated in Figs. 2 and 5, where it will be retained by the trigger. The fishing line is then securely though temporarily fastened relative to piston 12, such as, by way of example, by wrapping same about pins 22, thereby securing the line to the piston.

Any forward pull on line 80 will now be opposed by pins 22 thereby imparting a downward component of force to elevated trigger eyelet 36 as line 80 tends to assume a straight line relationship between rod eyelet 72 adjacent the trigger eyelet 36 and pins 22. This will result in a lowering of the forward portion 34 of the trigger resulting in the elevation and simultaneous disengagement of latch 40 from pin 24, thereby releasing piston 12, which will be rapidly retracted to the rear end of housing 10 by spring 14. The result of thus suddenly retracting piston 12 will be to impart a sudden, sharp, rearward pull onto the fishing line 80 which will effectively imbed a hook into the mouth of a fish whose activities originally initiated the forward pull onto the fishing line.

In the device illustrated in Figs. 1 through 5, inclusive, pivot 34 is disposed in spanning relationship with a pair of laterally spaced ears 41 suitably secured to and carried by the upper end of supports 50.

The primary distinction between the device of Fig. 6 and that illustrated in Figs. 1 through 5 resides in the manner in which the device is secured to rod 70, it being noted that in Fig. 6 the housing is secured to the rod by means of clamp elements 90 and set screws 92. Quite obviously the device of Fig. 6 does not support rod 70 but is securely though releasably fastened to the rod whereby to function as a fishing line actuator, the structural details and operational characteristics being identical with the device hereinabove described with reference to Figs. 1 through 5.

It should be understood that various modifications and changes in the structural details of the device may be made within the scope of the appended claim without departing from the spirit of the invention.

What is claimed is:

A combination fishing rod holder and line actuator, comprising a pair of laterally spaced supports, a cylinder secured to and spanning one end of said supports, a piston slidably receivable within said cylinder, resilient means normally urging said piston to the rear end of the cylinder, a trigger pivotally secured relative to the forward end of the cylinder including a portion which projects forwardly of and beyond the cylinder and a portion which extends rearwardly over the forward end of the cylinder, the rearward portion of the trigger including means releasably engageable with said piston for securing it at the forward end of the cylinder against the counterforce of the resilient means, said piston including means releasably engageable by a fishing line, the forward portion of the trigger terminating in a fishing line receptive eyelet, and fishing rod clamping means on said supports, said means comprising axially aligned notches in a side of each of said supports below said cylinder, and clamps in each notch, said clamps each including a rod engaging leg and a support engaging leg, means for releasably securing the support engaging legs to their respective supports, each said rod engaging leg being adapted to abut a fishing rod disposed in said notches and spanning said supports for mounting said rod below said cylinder whereby the forward end of the trigger may be disposed with its eyelet above, adjacent and rearward of a line eyelet of the rod, the free ends of said supports adapted to be inserted into a supporting surface.

DONALD D. LEACH.

References Cited in the file of this patent

UNITED STATES PATENTS

| Number | Name | Date |
| --- | --- | --- |
| 272,232 | Gaume | Feb. 13, 1883 |
| 657,518 | Cook | Sept. 11, 1900 |
| 1,576,233 | Cook | Mar. 9, 1926 |
| 2,566,496 | Montano | Sept. 4, 1951 |
| 2,590,721 | Muth | Mar. 25, 1952 |

FOREIGN PATENTS

| Number | Country | Date |
| --- | --- | --- |
| 87,575 | Germany | July 28, 1895 |
| 606,406 | France | Mar. 8, 1926 |